July 26, 1960
R. E. ALLAN
2,946,246
DRILL FIXTURE
Filed Sept. 20, 1957
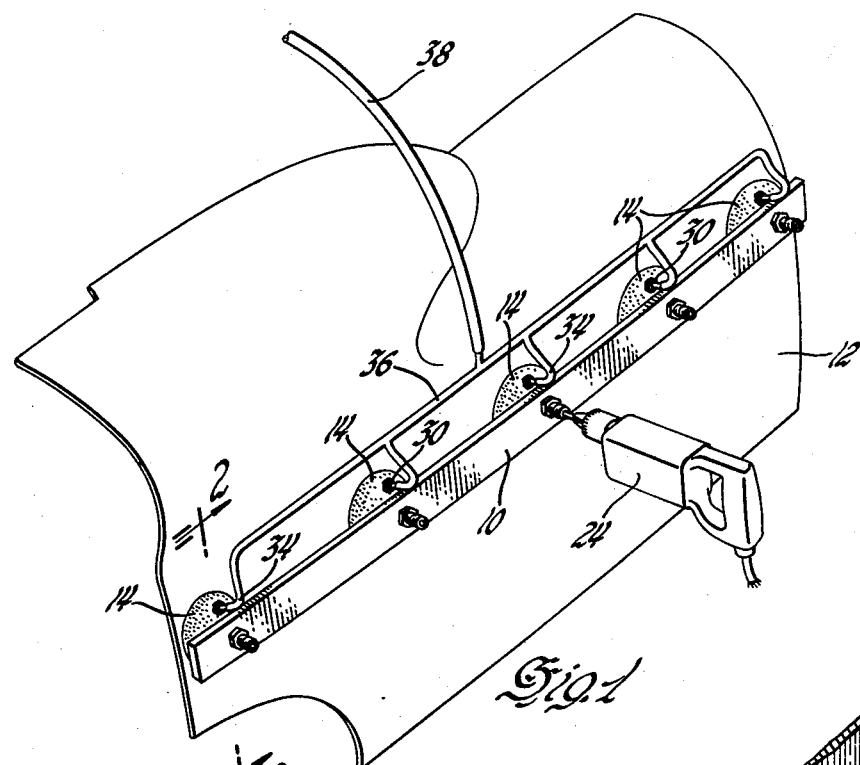
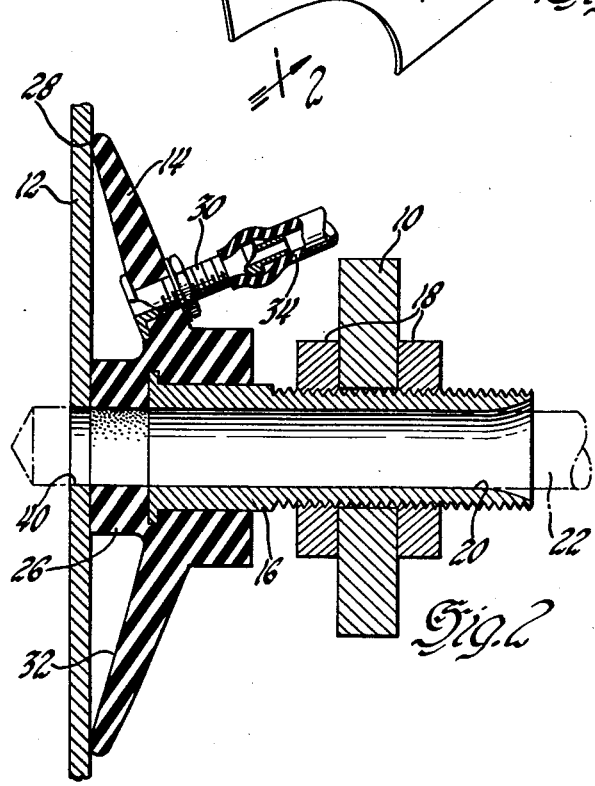
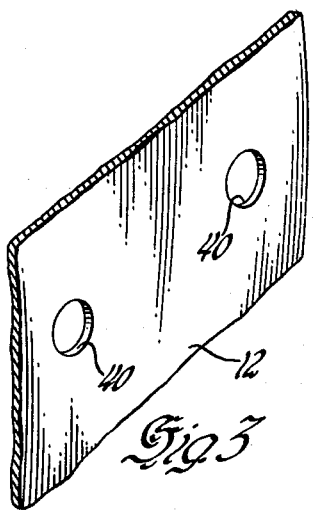
INVENTOR.
Robert E. Allan
BY
L. D. Burch
ATTORNEY.

United States Patent Office 2,946,246
Patented July 26, 1960

2,946,246

DRILL FIXTURE

Robert E. Allan, Rochester, Mich., assignor to General Motors Corporation, Detroit, Mich., a corporation of Delaware Filed Sept. 20, 1957, Ser. No. 685,110

4 Claims. (Cl. 77—62)

This invention relates to drill fixtures in general and more particularly to a vacuum cup drill fixture for eliminating dimples or depressions in body panels caused by the pressure required to drill holes therein for molding attachments or the like.

A certain amount of pressure is required to be exerted against a panel within which a hole is to be made by a drill bit. With a thin walled sheet metal panel this pressure may cause dimples or depressions in the panel member.

It is here proposed to provide a drill fixture including a vacuum cup attachment which may be disposed against the body panel to be drilled. An access is provided centrally through the vacuum cup to receive the drill bit and air is then extracted from the vacuum cup to create a vacuum on the side of the panel against which the drill pressure is to be exerted. The negative pressure asserted acts to oppose the forming of dimples or depressions in the panel by the pressure required to drill the holes.

In the drawing:

Figure 1 illustrates a vehicle body panel having the proposed type of drill fixture shown engaged therewith.

Figure 2 is a cross-sectional view of one of the vacuum cups of the proposed drill fixture.

Figure 3 shows the clean holes formed in a panel by use of the proposed vacuum cup drill fixture.

This invention as used to drill holes in a vehicle body panel for fender or other ornamental molding attachments includes a frame 10, of a shape dictated by the molding to be used and by the contours of the body panel 12, and having vacuum cups 14 provided at spaced intervals thereon.

The vacuum cups each include a fitting 16 to which they are bonded or otherwise secured and which in turn are secured to the frame 10 by some fastening means such as the nuts 18 threaded on the end of the fitting.

An access 20 is provided centrally through the fitting and the vacuum cup to receive the drill bit 22 of a portable drill 24 and to provide a guide therefor.

A ferrule 26 of rubber or like material is molded from or into the vacuum cup around the central hole provided therein and extends to within substantially the plane of the outer peripheral lip 28 of the vacuum cup; both being receivable against the surface of the body panel member.

A fitting 30 for the extraction of air from the vacuum cup is provided through the cup member to the annular space 32 between the ferrule 26 and the peripheral lip 28 thereof. A vacuum exhaust line 34 is connected to each of the fittings 30 and to a common line 36 joined by an exhaust line 38 which in turn connects to a source for extracting air from the vacuum cups to induce the vacuum within the chamber 32.

The annular or doughnut-shaped vacuum created around the holes 40 which are formed within the body panel counteracts the drilling pressure and prevents the panel from dimpling inward.

If desired, the proposed vacuum cup arrangement may be adapted to hold the fixture to the body panel. Also, quite obviously, the frame member 10 need not be a rigid bar member but may be an articulated member in order that the same vacuum cup drill fixture may be adapted for use in drilling holes for numerous different molding strips.

These and other advantages will become more apparent from further study of the description just given and in using and experimenting with a device of the type just disclosed.

What is claimed is:

1. A drill fixture comprising a vacuum cup adapted to be engaged to a wall member within which a hole is to be drilled, an access provided centrally through said vacuum cup to receive a drill bit, and means operatively engaged with said vacuum cup for extracting air from between said cup and said wall member to form a vacuum pressure on said wall member counteracting the normal dimpling effect of the pressure required to be exerted by said drill bit against said wall member in forming a hole therethrough.

2. The drill fixture of claim 1 wherein said vacuum cup includes a central ferrule extending to within the plane of the peripheral lip thereof and forming a separate vacuum chamber apart from said drill bit access and having said air extracting means communicating therewith.

3. A drill fixture comprising a bar member having a plurality of vacuum cup members engaged thereto and disposed at spaced intervals thereon, said vacuum cup members being further disposed for engagement with a wall panel member within which a plurality of holes are to be formed, an access provided centrally through said bar and vacuum cup members for permitting a work tool to be engaged with said wall panel member therethrough, and means operatively connected with each of said vacuum cup members for extracting air from between said cup members and said wall panel member to form a negative pressure area opposing and counteracting the positive pressure exerted by said work tool in forming holes in said panel.

4. A drill fixture for preventing the forming of depressions in a thin walled panel member by the pressure of a drill bit thereagainst in the forming of a hole through said wall panel member and which comprises a vacuum cup member adapted to have the concave surface thereof disposed for engagement with said wall panel about the area thereof through which said hole is to be formed, a drill bit receiving and guiding access provided through said vacuum cup member, a ferrule provided within the concave portion of said vacuum cup member about said access and extending outwardly to substantially the plane of the outer peripheral lip of said vacuum cup member, and means engaged through said vacuum cup member between said ferrule and said peripheral lip and in communication with the annular space formed therebetween and between said wall panel and said vacuum cup member for extracting air from said annular space and forming a negative pressure therein counteracting the positive pressure of said drill bit against said panel in forming a hole therethrough.

References Cited in the file of this patent

UNITED STATES PATENTS

| | | |
|---|---|---|
| 1,729,131 | Shaff | Sept. 24, 1929 |
| 2,417,539 | Aronson | Mar. 18, 1947 |